United States Patent
Ernst

[15] 3,658,136
[45] Apr. 25, 1972

[54] ROW CROP THINNING IMPLEMENT

[72] Inventor: Arnold E. Ernst, Wolverton, Minn. 56594

[22] Filed: Mar. 2, 1970

[21] Appl. No.: 15,541

[52] U.S. Cl. .................................. 172/54, 172/86, 172/107, 172/303, 172/468, 172/675
[51] Int. Cl. ............ A01b 33/04, A01b 41/02, A01b 59/048, A01b 63/118
[58] Field of Search ................................ 172/53–54, 57–58, 172/73, 76, 79, 107, 84–89, 6, 308, 312, 501, 503, 479, 671, 675, 421; 47/1.43

[56] References Cited

UNITED STATES PATENTS

| | | | |
|---|---|---|---|
| 2,744,459 | 5/1956 | Craig | 172/107 |
| 2,626,553 | 1/1953 | Newlin | 172/479 |
| 2,980,190 | 4/1961 | Hannagan | 172/79 |
| 3,014,537 | 12/1961 | Thelander et al. | 172/107 |
| 3,181,618 | 5/1965 | Miller | 172/6 |
| 2,616,348 | 11/1952 | Ariens | 172/312 |
| 2,648,269 | 8/1953 | Maurer | 172/479 |
| 3,138,210 | 6/1964 | Behrens | 172/421 |

FOREIGN PATENTS OR APPLICATIONS

| | | | |
|---|---|---|---|
| 247,060 | 5/1966 | Austria | 172/54 |
| 559,865 | 10/1957 | Belgium | 172/85 |
| 197,626 | 5/1958 | Germany | 172/58 |

Primary Examiner—Robert E. Pulfrey
Assistant Examiner—C. W. Hanor
Attorney—Henderson & Strom

[57] ABSTRACT

An improved apparatus for thinning growing plants planted in a row and growing less than a predetermined distance apart; the apparatus including an implement having a hoe swingable in a pendular arc to engage and remove undesired plants, the hoe connected to a shaft mounted on and extended coaxially to a wheeled frame pivotally connected to a self-propelled vehicle, a motor operably connected to the shaft and adapted to selectively adjust the speed of the swinging hoe independently of the speed of the vehicle, and a lift mechanism to raise and lower the implement frame relative to the ground for operating and transporting purposes.

The lift mechanism includes a hydraulically operated piston and cylinder unit pivotally connected to the vehicle below the implement frame, a lift member connected to and embracing the unit, the member having a flanged lower end, and a sleeve member pivotally connected to the frame and slidably mounting the lift member thereto whereby extending the unit engages the lift member flange and the sleeve to raise the frame, the frame and sleeve member being free to pivot downwardly upon contraction of the unit.

The vehicle is hydraulically powered and includes a frame and engine, a pair of drive wheels, a pair of steerable wheels, and a hydraulic mechanism including a hydraulic motor interconnecting the engine and drive wheels to propel the vehicle.

10 Claims, 16 Drawing Figures

INVENTOR
ARNOLD E. ERNST
BY
Henderson & Strom
ATTORNEYS

INVENTOR
ARNOLD E. ERNST
BY
Henderson & Strom
ATTORNEYS

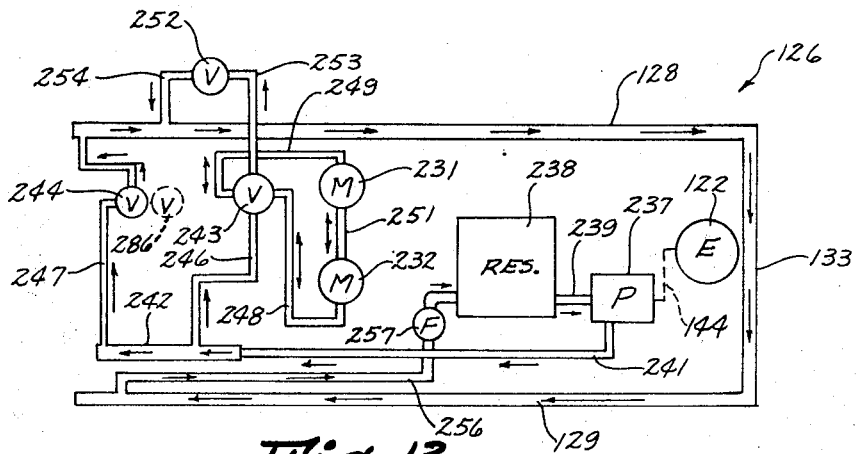
Fig. 13
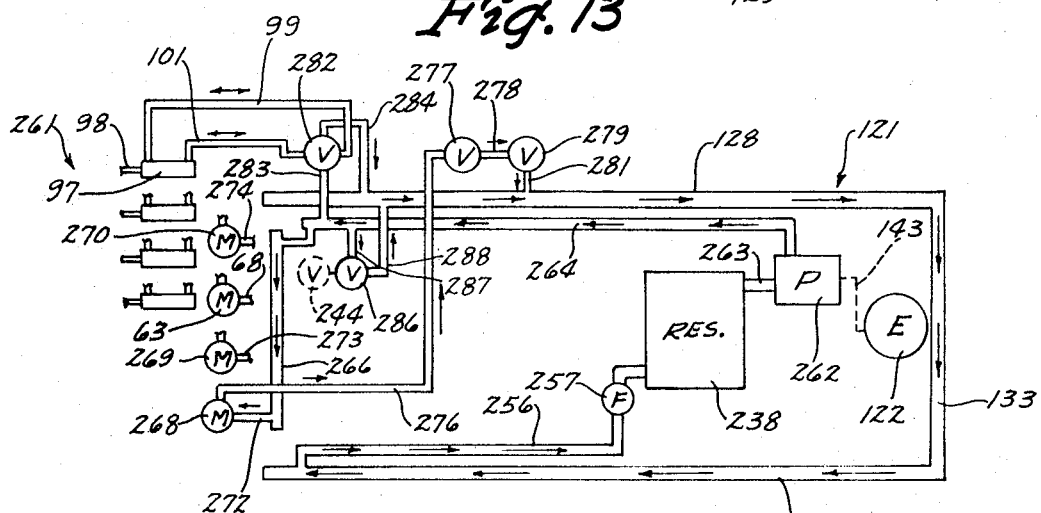
Fig. 14
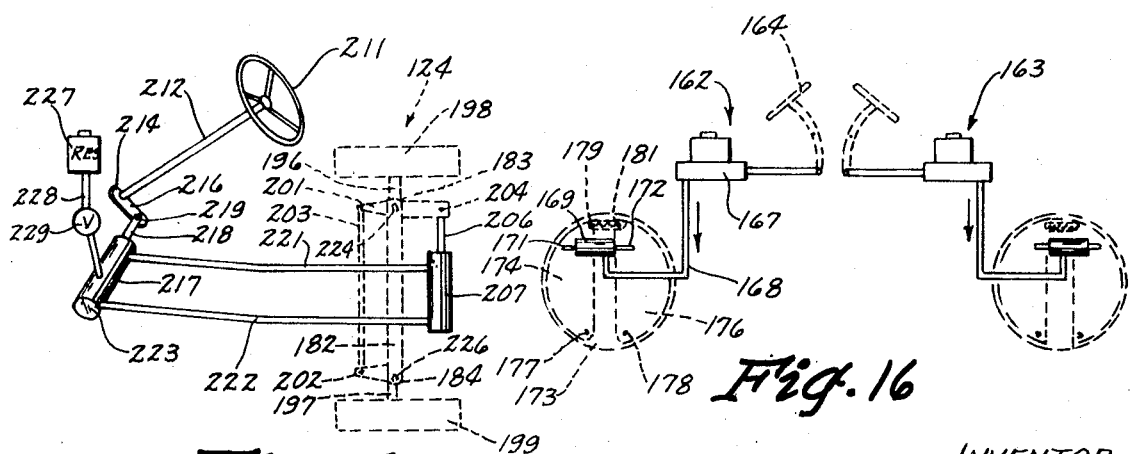
Fig. 15
Fig. 16
INVENTOR
ARNOLD E. ERNST
BY
Henderson & Strom
ATTORNEYS

ROW CROP THINNING IMPLEMENT

BACKGROUND OF THE INVENTION

This invention relates generally to agricultural implements and particularly to an improved implement for thinning plants from a row crop such as sugar beets and cotton.

Certain crops, such as sugar beets, grow sporadically in a planted row whereby a row may contain a thick growth in certain areas and a thin growth in other areas. Likewise, one row may exhibit a thick growth immediately adjacent a row exhibiting a thin growth. This sporadic growth creates mechanical problems when thinning and spacing the plants a desired distance apart for optimum growth. As a result, migrant farm laborers are still widely used, even today, to manually thin the crops, which labor increases the cost of these crops to the farmer and to the eventual consumer.

Early attempts to mechanize the thinning operation are illustrated in U.S. Pat. Nos. 1,112,029 and 1,136,930 showing a pendular hoe operated by the revolving implement wheels, which implement is adapted for movement by an appropriate farm animal. Though the inventions illustrated in these patents are good machines, they are unadaptable for multiple row use and modern mechanical power since the nature of the crop to be thinned requires independent speed adjustments of the how apart from the vehicle speed and the thinning operation is such, owing to the irregular plant growth, that an operator optimumly should be positioned with a clear view of both the plant rows and the hoe operation in order to effectively operate each "thinner."

Modern attempts to improve the thinning devices have included the use of an electric-eye beam to automatically control the selective thinning process. This improvement works well provided a field is substantially free of weeds and that the thinning operation is performed during a certain predetermined period of plant growth. The problem with this type of device is that anything in a field, such as a clump of dirt or an ordinary weed, breaks the beam which prevents the thinning device from acting as optimumly desired. An additional problem found in the modern thinning devices is that they are attached to the rear of an ordinary farm tractor, such that selective operator control is either hampered or impossible because of operator's poor visibility of the effectiveness of the machine. Also, the multi-row thinners presently known are all operable in unison without separate thinner row controls such that the thinners of the implement covering all rows operate at identical speeds. The problem encountered with this type of device is that a faster hoe speed may be needed in some rows to thin densely growing areas while adjacent rows may contain a sparse growth and require less hoe speed or none at all.

The device of this invention will overcome all of the aforementioned problems and contemplates a unit operable by one person having forward unobstructed visibility and control over one or more thinning devices, which unit is operable over any field to provide an optimum thinning operation.

SUMMARY OF THE INVENTION

This invention relates to a row crop thinning apparatus for thinning growing plants from a row wherein the plants are planted less than a predetermined distance apart, the apparatus comprising a self-propelled vehicle having a forwardly mounted tool bar; an elongated frame having one end thereof pivotally connected to the tool bar and the opposite end thereof connected to a pair of rotatable wheels for engaging the ground, the frame extending forwardly of the vehicle and in alignment with the row; a rotatable shaft connected to the frame; a mechanism to reciprocally rotate the shaft; a hoe connected to the shaft and operably swingable in a pendular arc traversing the row to engage selected plants for removal from the row; and a lift mechanism connected to the frame and vehicle for lifting the frame relative to the ground, the lift mechanism including a hydraulic cylinder and piston unit connected at one end to the vehicle below the frame and forwardly of its connection to the vehicle, a lift bar embracing the unit and connected thereto whereby the unit raises and lowers the bar relative to the connection of the cylinder to the vehicle, and a sleeve slidably mounted on the bar and pivotally connected to the frame, the sleeve being engaged by the bar upon raising movement to raise the frame and being slidably disengagable therefrom upon downward movement of the bar to lower the frame. The vehicle is hydraulically propelled and provides a forwardly mounted operator's position providing unobstructed visibility of all the thinning hoes resulting in constant operator control thereover.

It is an object of this invention to provide an improved row crop thinning apparatus adaptable for use over any field regardless of the contour thereof.

It is still another object of this invention to provide a thinning apparatus whereby a number of rows may be thinned simultaneously by a number of thinning implements similarly connected to a common vehicle, wherein the operator may individually control each implement to optimumly conform its operation to the plant growth of the particular row it is thinning.

It is a further object of this invention to provide a lift mechanism for a thinning implement extended forwardly of a vehicle, the mechanism capable of lifting the implement for transport and capable of lowering the implement for thinning purposes, yet permits the implement free pivotal movement relative to the propelling vehicle to enable the thinning implement to pivot in conformity to the field contour.

Another object of this invention is to provide a vehicle adaptable for use with a row crop thinning device wherein the vehicle propels the device forwardly of the vehicle and provides complete visibility over the thinning operation to the operator, without the operator being required to turn around in his seat so as to view the operation.

A further object of this invention is to provide a vehicle having a hydraulic system capable of propelling the vehicle and means to power auxiliary implements attached thereto.

Still another object of this invention is to provide a crop thinning apparatus that is simple to operate, economical to manufacture, and rugged in construction.

These objects and other features and advantages of the apparatus of this invention will become readily apparent upon reference to the following description when taken in conjunction with the accompanying drawings.

BRIEF DESCRIPTION OF THE DRAWINGS

FIG. 3 is an enlarged plan view of one of the thinning implements;

FIG. 4 is a cross-sectional view as taken along the line 4—4 of FIG. 3;

FIG. 5 is a rear elevational view of one of the lift mechanisms of this invention as taken along the line 5—5 of FIG. 4;

FIG. 6 is a rear elevational view of the lift mechanism of FIG. 5 showing the thinning device in raised position;

FIG. 7 is an enlarged cross-sectional view as taken along the line 7—7 of FIG. 5;

FIG. 13 is a schematic diagram of the hydraulic system for propelling the vehicle;

FIG. 14 is a schematic diagram of the hydraulic system for powering the thinning elements;

FIG. 15 is a reduced schematic diagram of the steering assembly of the vehicle; and FIG. 16 is a reduced schematic view of braking assembly of the vehicle.

DESCRIPTION OF THE PREFERRED EMBODIMENT

Figure 1:
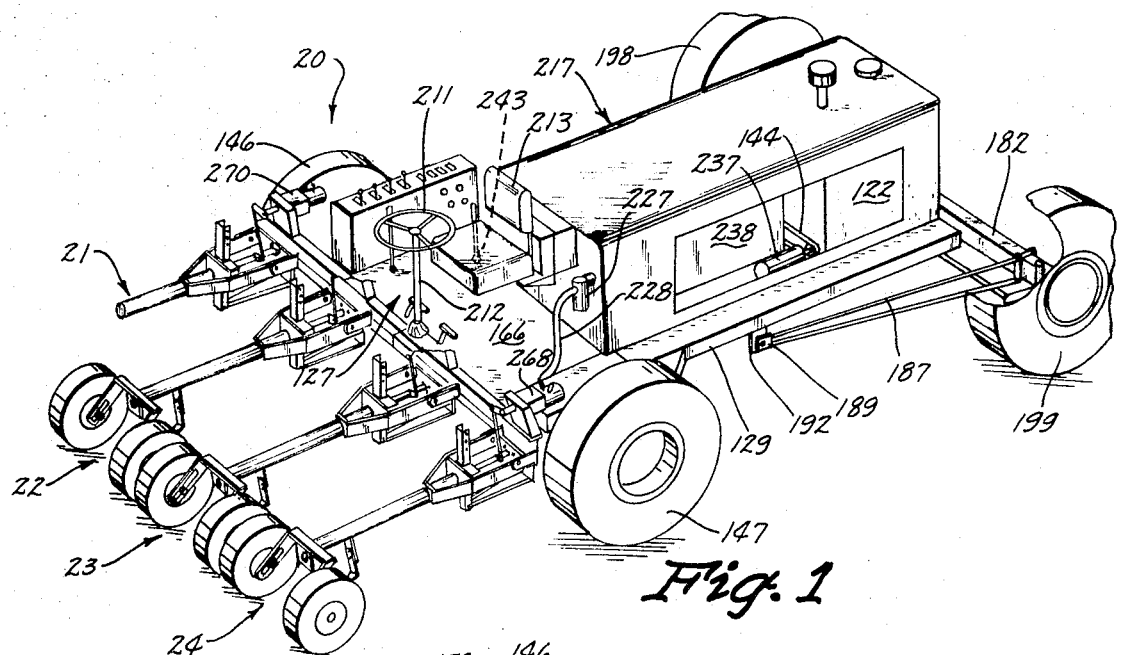
FIG. 1 is a perspective view of the row crop thinning apparatus of this invention with some parts broken away for clarity of illustration.
Figure 2:
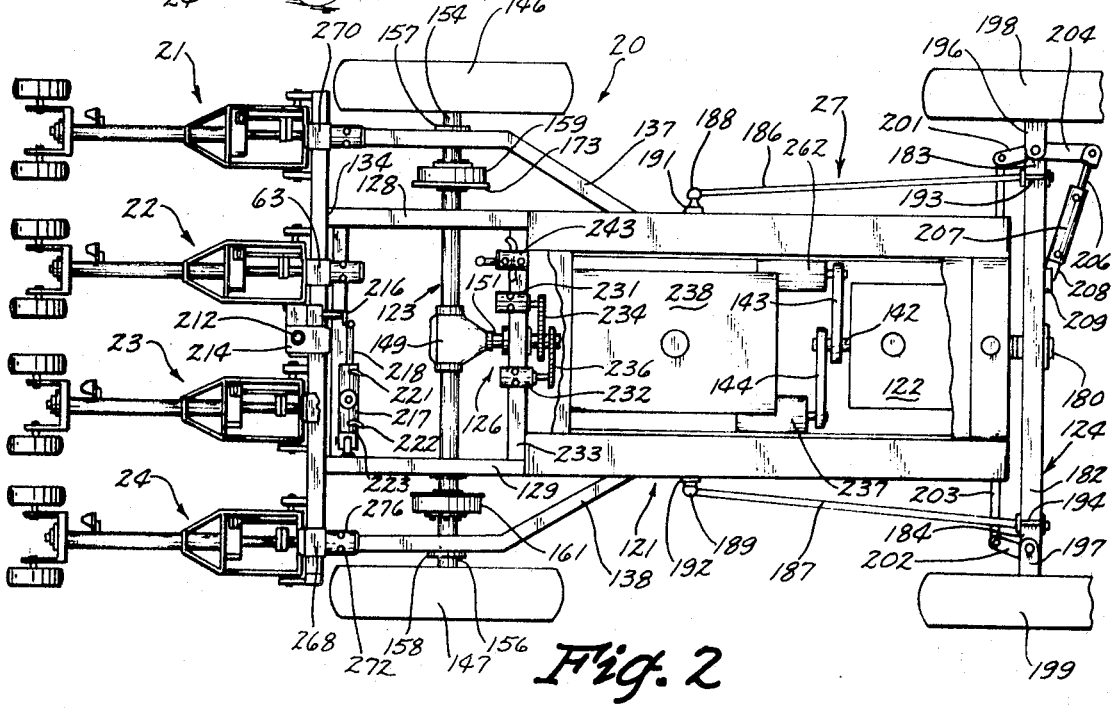
FIG. 2 is a plan view of the apparatus of FIG. 1 with certain parts cut away for clarity of illustration.

Referring now to the drawings and particularly to FIGS. 1 and 2, the row crop plant thinning apparatus of this invention is indicated generally at 20. The apparatus 20 generally comprises one or more thinning implements 21, 22, 23 and 24 pivotally connected to the tool bar 26 of a self-propelled vehicle 27. Each of the thinning implements 21–24 are identical and for purposes of brevity, only one implement 22 will be hereinafter described.

The thinning implement 22 (FIGS. 3 and 4) generally includes a elongated frame 28 connected to a wheel unit 29, a hoe unit 31 connected to a shaft 32 rotatably mounted to the frame 28, a motor unit 33 to provide movement to the shaft 32, and a lift mechanism 34 connected to the frame 28 and vehicle 27 to raise and lower the implement 22 relative to the ground 36. The implement 22 is extended forwardly of the vehicle 27 and is adapted to be pushed through a field thereby.

More specifically, the frame 28 (FIGS. 3 and 4) includes a mounting assembly 37 pivotally connected to the tool bar 26 and a tubular housing 38 attached to the assembly 37 and extending forwardly thereof. The housing 38 is provided with a bottom aperture 39 formed therein to provide for extending the hoe unit 31 from the shaft 32, as hereinafter described.

The mounting assembly 37 (FIG. 3) includes a pair of parallel mounting bars 41 and 42 connected, as by welding, to a pair of crossbars 43 and 44. The mounting bars 41 and 42 converge from the crossbar 43 to connect to the housing 38 along its axis. A pair of axially aligned holes (not shown) are formed in the mounting bars 41 and 42 to receive conventional fasteners 46 and 47 to secure the implement frame 28 to the tool bar 26. Crossbars 43 and 44 are also provided with holes (not shown) axially aligned with the housing 38 to receive and mount the shaft 32, as hereinafter described. A mounting arm 48 is attached to the crossbar 43 and is extended rearwardly therefrom. The arm 48 includes an aperture (not shown) axially aligned with a corresponding aperture (not shown) formed in the mounting bar 41 for mounting the lift mechanism 34 as hereinafter described.

The implement frame 28 further includes a pair of bearings 49 and 51 (FIG. 3) axially aligned with the housing 38 to receive and rotatably mount the shaft 32 thereto. One bearing 49 is attached to the crossbar 44 adjacent the aperture (not shown) formed therein, and the bearing 51 is attached to the extended end 52 of the housing 38.

The shaft 32 (FIGS. 3 and 4) is extended substantially the length of the frame 28 through the bearings 49 and 51. A pair of washers 56 and 57 are placed over the opposite ends 58 and 59 of the shaft 32 and a cotter pin (not shown) or the like is appropriately secured to the shaft 32 to fasten the shaft 32 to the frame 28.

A lever 61 (FIG. 3) extended laterally of the shaft 32 is connected thereto adjacent the crossbar 44 for purposes hereinafter described. A second lever 62 is attached to the shaft 32 along its axis and extends downwardly through the aperture 39 formed in the housing 38 to connect the hoe unit 31, as hereinafter described.

The motor unit 33 (FIGS. 3 and 4) generally includes a motor 63, a cam 64 and a connecting rod 66. The motor 63, preferably of the hydraulic variety, is secured to a motor mount 67 attached to the forward portion of the vehicle 27, and is connected with hydraulic lines 68 and 69. The drive shaft 71 of the motor 63 extends forwardly of the vehicle 27 and tool bar 26 as best illustrated in FIG. 4. Attached to the drive shaft 71 is a conventional cam 64. The cam 64 is connected to the lever 61 of the shaft 32 by the connecting rod 66, whereby operation of the motor 63 imparts a reciprocal rotational movement to the shaft 32.

Figure 11:
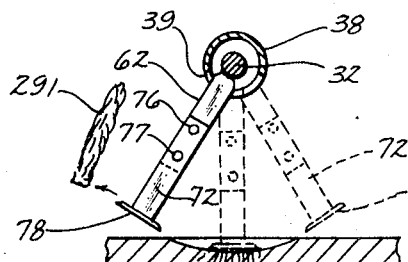
FIG. 11 is an enlarged cross-sectional view as taken along the line 11—11 of FIG. 10, showing the pendular swing of the hoe by the use of full and dotted lines.
Figure 12:
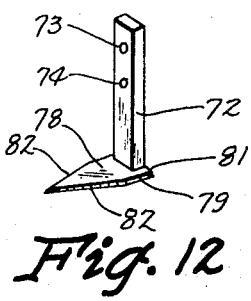
FIG. 12 is a perspective view of the hoe of the apparatus.

The hoe unit 31 (FIGS. 4, 11 and 12) includes a rod member 72 having a pair of apertures 73 and 74 formed therein to receive a pair of conventional bolt and nut fasteners 76 and 77 to connect the unit 31 to the downwardly extending lever 62 of the shaft 32. A hoe blade 78 is attached to the extended end 79 of the member 72 adjacent the back side 81 of the blade 78. The blade 78 is positioned normal to the member 72 and generally is honed to have a cutting edge 82 about its periphery.

To support the extended end 52 (FIGS. 3 and 4) of the implement frame 28 above the ground 36, a wheel unit 29 is provided. The wheel unit 29 includes a beam 83 extended generally normal to the axis of the housing 38 and is attached thereto adjacent the extended end 52 thereof. A pair of mounting arms 84 and 86 are attached, as by welding, to the ends 87 and 88 of the beam 83 and are extended downwardly thereof and preferably inclined forwardly of the beam 83. Each arm 84 and 86 is provided with an axial slot 89 mounting a pair of wheels 91 and 92.

The wheels 91 and 92 are spaced apart and independently connected to the arms 84 and 86 respectively by axle bolts 93 and 94 secured by appropriate nuts (not shown). By appropriately positioning the bolts 93 and 94 in the slots 89 along the arms 84 and 86, the operator is able to selectively adjust the end 52 of the frame 28 relative to the ground 36. It should be understood, that adjusting the frame 28 relative to the ground 36 likewise adjusts the depth of the hoe blade 78 relative to the surface 96 of the ground 36.

The wheels 91 and 92 engage the ground 36 and adapt the implement 22 to follow the contour thereof. Thus, as the implement 22 is pushed ahead of the vehicle 27, it may freely pivot about the axis of its pivotal connections 46 and 47 with the tool bar 26 and adapt to any contour or roll of a crop field and yet maintain the hoe blade 78 at a substantially constant depth relative to the surface 96 thereof.

To provide for raising and lowering of the implement 22 relative to the ground 36 for transporting and working purposes, a lift mechanism 34 (FIGS. 4–7) is provided. The mechanism 34 includes a hydraulic cylinder 97 and piston 98 connected by hoses 99 and 101 to controls hereinafter described disposed on the vehicle 27. The cylinder 97 and piston 98 are disposed in a substantially vertical position with the lower end 102 of the cylinder 97 pivotally connected to a bracket 103 by an appropriate fastener 104. The bracket 103 extends forwardly of the vehicle 27 and tool bar 26 and is disposed substantially under the implement 22 and intermediate its ends.

An elongated lift member 106, preferably of box-like construction in cross section (FIG. 7), has a pivotal connection adjacent its upper end 107 to the piston 98 by a pivot bar 108, or the like. The lift member 106 depends downwardly from the pivot bar 108 to embrace the cylinder 97 and piston 98. The lift member 106 is provided with an outwardly extending flanged bottom end 109, for purposes hereinafter described. A slot 111 extending the entire length of the lift member 106 is provided to allow unobstructed movement of the member 106 by the cylinder hoses 99 and 101.

A sleeve member 112 (FIGS. 4 and 5) having a pair of support arms 113 and 114 extended laterally thereof is pivotally connected by bolt and nut fasteners 116 and 117 to the mounting arm 48 and bar 41 of the implement frame 28. The sleeve 112 generally conforms in cross-sectional shape (FIG. 7) to the lift member 106 and is adapted to receive and slidably mount the member 106 to the frame 28. A slot 110 extending the length of the sleeve 112 is also provided to allow unobstructed movement of the sleeve by the hoses 99 and 101.

The lift mechanism 34 is operable to raise the implement 22 by extending the piston 98 from the cylinder 97 to raise the lift member 106. As the lift member 106 raises, it slides upwardly through the sleeve 112 until the lower flanged end 109 engages the lower edge 118 of the sleeve 112. The end 109 of the member 106 acts to raise the sleeve 112, causing the implement frame 28 to raise accordingly relative to the ground 36 in a pivotal motion about its axial connection to the tool bar 26. Upon retraction of the piston 98 into the cylinder 97, the lift member 106 is correspondingly lowered causing the frame 28 to be gravity lowered to the ground 36.

Referring now to FIGS. 1 and 2, the vehicle portion 27 of the apparatus 20 generally comprises a main frame 121, an engine 122 mounted on the frame 121, a first wheel assembly 123 connected to the frame 121 to provide support and movement to the vehicle 27, a second wheel assembly 124 pivotally connected to the frame 121 to provide support to the frame 121 and steerage to the vehicle 27, and a drive unit 126 interconnecting the engine 122 and the first wheel assembly 123 to provide mobility to the vehicle 27. An elongated tool bar 26 is extended substantially the width of the vehicle 27 and is connected to the frame 121 forwardly thereof to attach implements 21–24, or the like, to the vehicle 27. An operator's station 127, disposed immediately behind the tool bar 26, is provided.

The main frame 121 (FIG. 2) comprises a pair of elongated, parallel side beams 128 and 129 interconnected by a beam 133 disposed below the station 127. The beams 128, 129 and 133 are of a fluid tight, hollow construction, for purposes hereinafter described. The forwardly extended ends 134 and 136 of the beams 128 and 129 are sealed and the tool bar 26 is connected thereto. A pair of lateral support beams 137 and 138 are connected to the side beams 128 and 129 along the axis thereof, and extend outwardly and forwardly thereof to connect to the tool bar 26.

The engine 122 (FIG. 2) is mounted on the frame 121 adjacent the beam 133. A pair of pulleys (not shown) are connected to the drive shaft 142 of the engine 122 to mount belts 143 and 144 for purposes hereinafter described.

The first wheel assembly 123 (FIG. 2) supports the forward portion of the vehicle 27 and generally includes a pair of spaced drive wheels 146 and 147 disposed laterally of the respective support beams 137 and 138. The wheels 146 and 147 are operably connected to a conventional axle drive train (not shown) enclosed within an axle housing 148 and differential 149 secured to the frame 121. The drive train includes a fore-and-aft shaft 151 extending from the differential 149 to connect to a pair of sprocket wheels (not shown) operably connected to the drive unit 126, as hereinafter described.

Each wheel 146 and 147 (FIG. 2) respectively is mounted on and secured to an axle rod 154 and 156 rotatably mounted through bearings 157 and 158 appropriately connected to support beams 137 and 138 respectively. The rods 154 and 156 are respectively secured to brake drums 159 and 161 which are connected to and rotatably operable by the axle of the power train (not shown). By connecting the wheels 146 and 147 to the respective brake drums 159 and 161 in the aforementioned manner, each wheel 146 and 147 is provided with an independent braking system 162 and 163 (FIG. 16) and each wheel 146 and 147 may be moved laterally, relative to the support beams 137 and 138 to facilitate proper wheel placement between the crop rows.

Referring now to FIG. 16, a pair of brake systems 162 and 163 independently operable to control each of the respective wheels 146 and 147 are illustrated. Since the systems 162 and 163 are identical only one system 162 will be described. The brake system 162 only includes a foot pedal 164 pivotally connected to the floor 166 (FIG. 1) of the operator's station 127. Pressure upon the pedal 164 (FIG. 16) activates a master cylinder 167 to force brake fluid through a hose 168 (see arrow) fluidly connecting the master cylinder 167 to a conventional brake cylinder 169. The brake cylinder 169 includes a pair of oppositely disposed pistons 171 and 172 and is secured to a back plate 173. The plate 173 and the brake drum 159 enclose the brake cylinder 169 and a pair of conventional brake shoes 174 and 176. The shoes 174 and 176 are pivotally connected at one end 177 and 178, respectively, to the plate 173 and are connected at the opposite end 179 and 181 to the pistons 171 and 172 respectively. The pressurized fluid forces the pistons 171 and 172 and the respective shoes 174 and 176 apart to frictionally engage the drum 159 and thereby selectively slow the rotation of the wheel 146, or stop its movement completely. Thus, by stopping rotation of one wheel in this manner, while continuing to rotate its counterpart, the vehicle 127 is capable of making a pivot turn about the vertical axis of the braked wheel 146 or 147, which turn is often necessary in a planted field.

The second wheel assembly 124 (FIG. 2) includes a generally horizontally disposed, elongated support member 182 pivotally connected at 180 to the frame 121 midway between the ends 183 and 184 of the member 182. A pair of side braces 186 and 187 are provided to laterally reinforce the support member 182. The braces 186 and 187 are respectively pivotally connected at one end 188 and 189 to brackets 191 and 192 connected to and extending downwardly from beams 128 and 129 of the frame 121. The rearwardly extending ends 193 and 194 of the respective braces 186 and 187 are appropriately secured to the support member 182 adjacent the respective ends 183 and 184 thereof.

A pair of wheel mounting members 196 and 197 (FIG. 2) are pivotally connected respectively to the ends 183 and 184 of the support member 182 and include an axle rod (not shown) extending laterally thereof which extends substantially coaxially to the mounting member 182. A pair of spaced apart wheels 198 and 199 are rotatably mounted on the axle rods and are connected thereto. The wheels 198 and 199 are longitudinally aligned with the drive wheels 146 and 147 and are, together with mounting members 196 and 197 pivotal about the support member 182 to provide steerage for the vehicle.

The wheel mounting members 196 and 197 (FIGS. 2 and 15) are respectively provided with forwardly extending levers 201 and 202 interconnected by a connecting rod 203 extended therebetween and below the frame 121. The connecting rod 203 is pivotally connected to the levers 201 and 202 and enables synchronized movement of the wheels 198 and 199.

The second wheel assembly 124 (FIGS. 2 and 15) further includes a second lever 204 secured to the wheel mounting member 196 which lever 204 extends rearwardly of the mounting member 196. The lever 204 is pivotally connected to a piston 206 and cylinder 207 one end 208 of the cylinder 207 being pivotally connected to a bracket 209 attached to the support member 182. The piston 206 and cylinder 207 are operatively connected to a conventional steering wheel 211 (FIG. 15) and rotatable shaft 212 and are operable to pivotally turn the wheels 198 and 199 to provide steerage to the vehicle 27.

The steering wheel 211 and rotatable shaft 212 are disposed at the operator's station 127 immediately forward of the operator's seat 213 with the base 214 of the shaft 212 appropriately mounted to the frame 121 of the vehicle 27, as best illustrated in FIG. 2. Since the steering wheel 211 and shaft 212 are conventional and well known in the art, the particular base 214 of the shaft 212 will not be described. Instead, a simplified explanation of the principal of the steering operation, as best shown in FIG. 15 will be described.

A second hydraulic cylinder 217 and piston 218 is attached to the frame 121 adjacent the tool bar 26. The extended end 219 of the piston 218 is pivotally connected to a cam member 216 attached to the base 214 of the shaft 212. The cam 216 is adapted to occilate upon rotation of the steering wheel 211 and shaft 212 and thereby appropriately extend and retract the piston 218 from and into the cylinder 218.

The second cylinder 217 (FIG. 15) is fluidly connected to the first cylinder 207 by a pair of hose lines 221 and 222 extending the length of the vehicle 27. Thus it may be seen, that turning the steering wheel 211 clockwise results in cam member 216 pushing the piston 218 into the cylinder 217. The inward movement of the piston 218 creates hydraulic pressure on the opposite end 223 of the cylinder 217 causing hydraulic fluid to flow through hose line 222 resulting in pressure upon the piston 206 and extention thereof from the cylinder 207.

The extending piston 206 forces the lever 204 outwardly and turns the wheels 198 and 199 in a counterclockwise direction about their pivot connections 224 and 226. Since the wheels 198 and 199 are disposed at the rear of the vehicle 27, a right turn of the vehicle 27, relative to the direction of movement results. A left turn may be made by reversing the fluid flow between the cylinders 219 and 207 by reversing the above described operation.

To adjust the response of the guide wheels 198 and 199 relative to the rotation of the steering wheel 211, a fluid reservoir 227 may be fluidly connected to the cylinder 217 by a hose 228 and valve 229. By opening the valve 229 to permit additional fluid into the cylinder 217, a more ready response to turning the steering wheel 211 will result. Likewise, if additional play is preferred in the response of the wheels 198 and 199 relative to turning of the steering wheel 211, fluid within the cylinders 207 and 217 and hose lines 221 and 222 may be removed to the reservoir 227.

Referring now to FIG. 2, the drive unit 126 to propel the vehicle 27 is illustrated. The drive unit 126 includes a pair of hydraulic motors 231 and 232 attached to crossbeam 233 of the frame 121. The motors 231 and 232 are operably connected to the fore-and-aft shaft 151 of the drive train, as hereinbefore described, by chains 234 and 236 respectively. The motors 231 and 232 are adapted to operate in unison to rotate the shaft 151 and drive wheels 146 and 147. It is to be understood however, that one larger motor may be substituted for the two relatively smaller motors 231 and 232 without affecting the utilization of the invention.

The motors 231 and 232 are powered by a hydraulic system schematically illustrated in FIG. 13. The hydraulic system of the drive unit 126 includes a conventional hydraulic pump 237 operably connected to the engine 122 by the belt 144 and is powered thereby. The pump 237 is fluidly connected to a fluid reservoir 238 by pump outlet 239, which reservoir 238 serves as a source of fluid for the pump 237.

The fluid is pressurized by the pump 237 and flows therefrom through the outlet conduit 241, which conduit 241 extends forwardly to connect to a manifold 242. A pair of valves 243 and 244 are fluidly connected to the manifold 242 by conduits 246 and 247 respectively, which valves 243 and 244 operate to direct the flow of fluid to either the motors 231 and 232 or to the hollow frame 121 for return to the reservoir 238, as hereinafter described.

The valve 243 (FIG. 13) serves to control the direction of rotation of the motors 231 and 232 and therefore controls the direction of movement of the vehicle 27. The pressurized fluid entering the valve 243 from conduit 246 may be directed by operation of the valve 243 to the motors 231 and 232 through either conduit 248 or 249.

The direction of flow of the fluid to and through the motors 231 and 232 determines the direction of movement of the vehicle 27. For example, if the desired direction of movement of the vehicle 27 is forwardly, the valve 243 is positioned to direct the flow of fluid through conduit 248 to first engage motor 232 and then motor 231 through connecting conduit 251, from which motor 231 the fluid returns to the valve 243 by return conduit 249. This flow of fluid causes the motors 231 and 232 to rotate in a clockwise direction, together with shaft 151 of the drive train to rotate the wheels 146 and 147. To reverse the direction of movement of the vehicle 27 the flow of fluid is reversed by the valve 243 resulting in a fluid flow through conduit 249 and a return to the valve 243 through conduit 248.

The returning fluid to the valve 243 is directed therefrom to restrictive valve 252 through conduit 253. The restrictive valve 252 serves to control the velocity of the fluid flow through the motors 231 and 232 and therefore controls the speed of the vehicle 27. The fluid then flows from the valve 252 through conduit 254 to the hollow beam 128 of the frame 121. The fluid returns to the reservoir 238 via the frame 121 and conduit 256 and from the reservoir 238 may be recirculated through the pump 237 again. A filter 257 is perferably connected to the conduit 256 between the beam 129 and reservoir 238 to remove from the fluid any foreign material.

The drive unit 126 further includes the by-pass conduit 247 (FIG. 13) including the by-pass valve 244 interconnecting the manifold 242 and the frame beam 128. To idle the vehicle 27, the valve 243 is closed to retard the flow of fluid to the motors 231 and 232, while the by-pass valve 244 is simultaneously opened. The open valve 244 causes the flow of fluid from the pump 237 to by-pass the motors 231 and 232 and to return directly to the reservoir 238 via the frame 121 through conduit 247.

As is well known in the art, the pressurized circulating fluid inherently heats and may tend to break the fluid down if the heat is kept at a high temperature for a long period of time. By employing the frame 121 in the dual capacity as a fluid return conduit, the frame 121 serves to cool the fluid by providing a large area from which to radiate the heat.

The vehicle 27 is further provided with an implement power unit 261 (FIGS. 2 and 14) to selectively operate implements 21–24 (FIG. 1) detachably connectable thereto. The power unit 261, like the drive unit 126, is an integral hydraulic system and incorporates the same reservoir 238 and fluid return, namely the frame 121 and conduit 256, to the reservoir 238 and for purposes of brevity, the circuitous flow of the fluid will only be described to the beam 128 or frame 121.

The implement power unit 261 (FIGS. 2 and 14) includes a second hydraulic pump 262 operably connected to the engine 122 by belt 143, thereby providing the pump 262 with a power source. The pump 262 is provided with a fluid inlet conduit 263, which inlet 263 serves to fluidly connect the pump 262 to the reservoir 238.

From the pump 263, the fluid flows forwardly through outlet conduit 264, which conduit 264 is fluidly connected to a dispensor tube 266 (FIGS. 4 and 14). The tube 266 is attached to the upright portion 267 of the brackets 103.

A plurality of hydraulic motors 63, 268, 269, and 270 (FIG. 14) are fluidly and independently connected to the dispensor tube 266 by hose lines 68, 272, 273, and 274. Each of the motors 63, 268, 269, and 270 are identical and similarly operated, and for purposes of brevity, the operation of only one motor 268 will be described. It should however be understood that each motor 63, 268, 269, and 270 is individually connected to the hydraulic system so as to be independently controlled.

The motor 208, fluidly connected to the dispensor tube 266, is provided with a fluid return conduit 276 (FIG. 14) fluidly connecting the motor 268 to a restrictive valve 277. The valve 277 is operable to control the flow of fluid through the motor 268 and thereby control the speed of the motor 268. Fluidly connected to the restrictive control valve 277 by conduit 278 is shut-off valve 279. The shut-off valve 279 operates to selectively restrict the flow of fluid through the motor 268 and thereby selectively operates as on on-and-off control for the motor 268. A conduit 281 fluidly connects the shut-off valve 278 to the frame 121 to provide a return for the fluid to the reservoir 238.

The cylinder 97 (FIGS. 5–7) and piston 98 of the implement lift mechanism 34 are also operated by the implement power unit 261. As explained hereinbefore, the lift mechanisms 34 of each of the implements 21–24 are identical and again for purposes of brevity, only the operation of the cylinder 97 and piston 98 as illustrated in FIG. 14 will be described.

The implement power unit 261 (FIG. 14) further includes a control valve 282 fluidly connected to the lift mechanism cylinder 97 by hoses 99 and 101. The valve 282 is fluidly connected to the outlet 264 by conduit 283 and to the frame 121 by return conduit 284. The valve operates to direct the flow of fluid to and from the cylinder 97 and thereby controls the lifting and lowering of the lift mechanism 34 and implement 22.

For example, to raise the implement 22, the valve 282 directs the flow of fluid from the outlet 264 to hose 101, thereby causing the piston 98 to be extended from the cylinder 97. As the piston 98 is being extended, the fluid in the cylinder 97 exits therefrom through hose 99 and is returned to the fluid return frame 121 by conduit 284. To retract the piston 98, the flow of fluid is reversed by the valve 282 causing the fluid to enter the cylinder 97 via hose 99 and to exit therefrom by hose 101 and to return to the frame 121 and reservoir 238.

Figure 8:
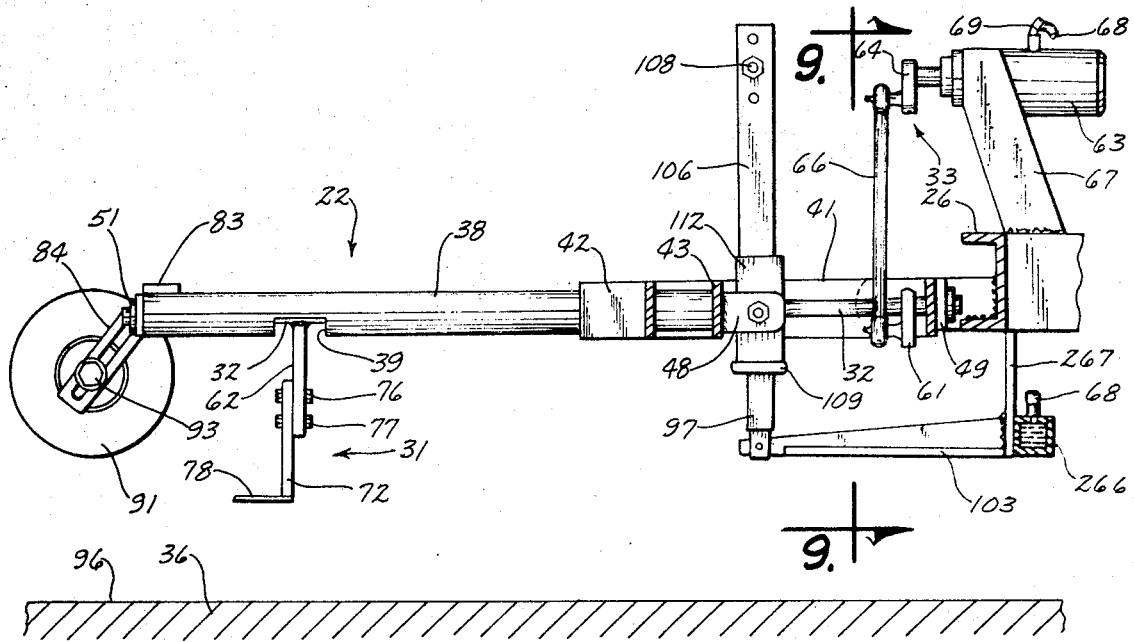
FIG. 8 is a cross-sectional view similar to FIG. 4 showing a thinning element in raised position.

The implement power unit 261 (FIG. 14) further includes a by-pass valve 286 fluidly connected to the outlet 264 and the frame 121 by conduits 287 and 288 respectively. Thus, when the vehicle 27 is in operation without the implements 21-24 attached or in transporting position (FIG. 8), the pump 262 (FIG. 14) will still be in operation and fluid will be circulating through the power unit 261. In this instance, the valves 279 and 282 will be closed to prevent circulation of fluid through the respective portions of the unit 261 which the valves 279 and 282 control and thus the by-pass valve 286 is opened to permit recirculation of the fluid from the pump 262 to the reservoir 238.

Figure 10:
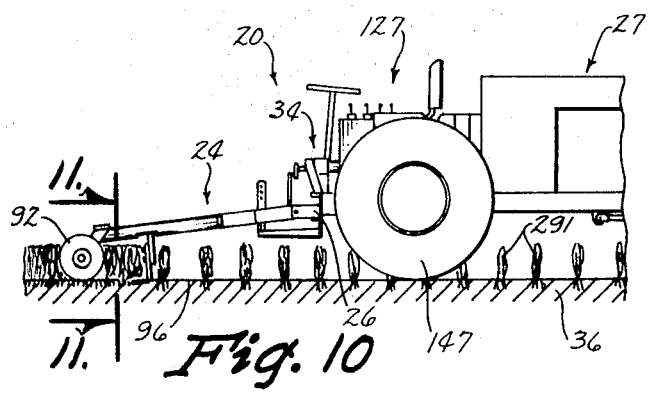
FIG. 10 is a reduced side elevational view of the apparatus illustrating its operation in a field.
Figure 9:
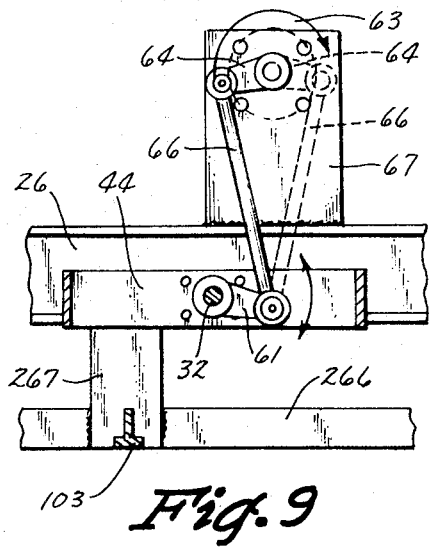
FIG. 9 is a cross-sectional view taken along the line 9—9 of FIG. 8.

Referring now to FIG. 10, the operation of the apparatus 20 may be described. The implement 24 is shown in lowered or working position with the wheels 91 and 92 engaging the surface 96 of the ground 36 and the hoe blade 78 movable to penetrate the ground surface 96 a predetermined depth. The wheels 91 and 92 straddle the row of plants 291 and align the implement 24 axially with the row.

With the implements 21-24 aligned with the respective rows, the speed of each of the motors 63, 268, 269, and 270 (FIG. 14) and the resulting reciprocation of each pendular hoe unit 31, is regulated by the operator, with the determining factors being the speed of the vehicle 27 and the thickness of growth of the plants 291 in the rows to be thinned. Ordinarily, the operator will select the vehicle speed at which he can effectively perform the complete thinning operation, considering the plant growth of the field, and keep the vehicle speed constant. The speed of each motor 68, 268, 269, and 270 is then individually regulated according to the growth exhibited by the plants 291 in each individual row.

Thus, in a row exhibiting a thick growth of plants, it is desirable to increase the movement of the hoe unit 31, and thereby increase the number of traversals of the row by the hoe unit 31 in a predetermined distance of the row to remove more plants from the row. Conversely, in a sparsely growing plant row it is desirable to decrease the number of row traversals by the hoe unit 31 and thereby limit unnecessary removal of plants.

Independent operation of each thinning implement 21-24 (FIG. 2) is imperative for a multi-row thinning apparatus 20 owing to the irregular growth of the plants 291 in the same or adjacent rows, as earlier explained. A hydraulically powered thinning apparatus 20 allows a multitute of speed variations for the hoe unit 31 and of the vehicle 27, without the necessity of added controls, such as clutch and transmission shift, to hinder the operator. Disposing the implements 21-24 forwardly of the vehicle 27 and in clear view of the forwardly positioned operator facilitate exact thinning of all rows being thinned.

I claim:

1. An apparatus for thinning growing plants planted in a row and growing less than a predetermined distance apart, the apparatus comprising:
   a self-propelled vehicle having a tool bar and adapted to move parallel one or more rows;
   an elongated frame having one end thereof pivotally connected to said tool bar, said frame extended forwardly of said vehicle and in the direction of movement thereof, said frame adapted to extend over a row;
   a shaft rotatably connected to said frame;
   means attached to said shaft to reciprocally rotate said shaft;
   hoe means connected to said shaft and swingable in a pendular arc by said shaft for engaging and removing the undesired plants;
   means attached to the extended end of said frame for supporting said frame above the ground; and
   means for raising and lowering said frame about its pivotal connection and including a hydraulic cylinder and piston unit connected at one end to said vehicle, a lift member substantially enclosing said cylinder and having a flanged lower end, said lift member connected to the other end of said unit, and a sleeve pivotally connected to said frame to receive and slidably mount said lift member from said flanged end engagable with said sleeve to raise said frame upon extension of said hydraulic unit and disengagable from said sleeve to lower said frame upon retraction of said unit.

2. An apparatus for thinning growing plants as defined in claim 1 wherein said frame includes a mounting assembly pivotally connected to said tool bar and a tubular housing attached to said assembly and extended forwardly thereof.

3. An apparatus for thinning growing plants as defined in claim 2 wherein said shaft is rotatably mounted within said housing and extends coaxially thereto.

4. An apparatus for thinning growing plants as defined in claim 3 wherein said housing includes an aperture formed in the bottom portion thereof through which said hoe means extends from its connection with said shaft.

5. An apparatus for thinning growing plants as defined in claim 4 wherein said shaft includes a lever connected thereto and extended laterally thereof, and said rotating means includes a motor having a cam operably connected thereto, and a connecting rod operably connecting said cam and lever to reciprocally rotate said shaft.

6. An apparatus for thinning growing plants as defined in claim 5 wherein said motor is mounted on said vehicle and includes controls to selectively adjust the speed of rotation of said shaft.

7. An apparatus for thinning growing plants as defined in claim 6 wherein said motor is hydraulically powered.

8. An apparatus for thinning growing plants as defined in claim 7 wherein said hoe means includes a hoe blade swingable through the pendular arc from one side of the row to the other in an oscillating manner.

9. An apparatus for thinning growing plants as defined in claim 8 wherein said frame supporting means further includes a beam extending substantially normal to said housing and secured to its outer end, said beam including a pair of downwardly extending wheel mounting arms, each of said arms having a slot formed therein, and a pair of axles extending through said slots and connected to said arms to rotatably mount a pair of wheels.

10. An apparatus for thinning growing plants as defined in claim 9 wherein said axles are slidably mounted in said slots to selectively adjust the height of said hoe blade relative to the axes of said wheels.

* * * * *